(12) United States Patent
Ruelle

(10) Patent No.: US 12,158,941 B2
(45) Date of Patent: Dec. 3, 2024

(54) ELECTRONIC SYSTEM AND METHOD FOR AUTHENTICATING INSTRUCTIONS AND OPERANDS WITHIN A CONTROLLER

(71) Applicant: STMicroelectronics (Grand Ouest) SAS, Le Mans (FR)

(72) Inventor: Frederic Ruelle, Marigné-Laillé (FR)

(73) Assignee: STMicroelectronics (Grand Ouest) SAS, Le Mans (FR)

(*) Notice: Subject to any disclaimer, the term of this patent is extended or adjusted under 35 U.S.C. 154(b) by 212 days.

(21) Appl. No.: 17/640,680

(22) PCT Filed: Sep. 2, 2020

(86) PCT No.: PCT/EP2020/074475
§ 371 (c)(1),
(2) Date: Mar. 4, 2022

(87) PCT Pub. No.: WO2021/043829
PCT Pub. Date: Mar. 11, 2021

(65) Prior Publication Data
US 2022/0327193 A1 Oct. 13, 2022

(30) Foreign Application Priority Data
Sep. 6, 2019 (FR) ..................... 1909826

(51) Int. Cl.
*G06F 21/44* (2013.01)
*G06F 13/16* (2006.01)

(52) U.S. Cl.
CPC .......... *G06F 21/44* (2013.01); *G06F 13/1668* (2013.01)

(58) Field of Classification Search
CPC ..... G06F 21/44; G06F 13/1668; G06F 21/575
See application file for complete search history.

(56) References Cited

U.S. PATENT DOCUMENTS

| | | | |
|---|---|---|---|
| 9,749,141 B2* | 8/2017 | Keidar | H04L 9/3263 |
| 2004/0148495 A1* | 7/2004 | Elbe | G06F 9/30138 |
| | | | 712/E9.035 |
| 2016/0050071 A1 | 2/2016 | Collart et al. | |
| 2019/0050602 A1* | 2/2019 | Sela | G06F 21/75 |
| 2019/0236281 A1* | 8/2019 | Hershman | G06F 21/85 |

\* cited by examiner

Primary Examiner — Meng Vang
Assistant Examiner — Tania M Pena-Santana
(74) Attorney, Agent, or Firm — Slater Matsil, LLP

(57) ABSTRACT

The present disclosure relates to a method for authenticating instructions and operands in an electronic system comprising a controller. The method includes extracting instructions and operands via a first circuit of the controller from at least a first memory internal to the controller using a matrix bus of the controller, collecting, on the matrix bus, via a second circuit internal to the controller, instructions and operands during their transmission to the first circuit, and generating a word representative of the instructions and operands.

23 Claims, 2 Drawing Sheets

ELECTRONIC SYSTEM AND METHOD FOR AUTHENTICATING INSTRUCTIONS AND OPERANDS WITHIN A CONTROLLER

CROSS-REFERENCE TO RELATED APPLICATIONS

This application is a national stage application of International Application No. PCT/EP2020/074475, filed on Sep. 2, 2020, which claims priority to French Patent Application No. 1909826, filed on Sep. 6, 2019, which applications are hereby incorporated herein by reference.

TECHNICAL FIELD

The present disclosure relates generally to electronic systems and methods, and more specifically to systems comprising a memory, and associated methods.

BACKGROUND

The security of electronic systems is especially important as the fields of connected objects, for example home automation, develop. In particular, it is important to be able to ensure that the data, meaning the startup instructions and the associated operand, stored in memories and executed during the initialization of the system indeed correspond to the desired instructions and not to instructions modified by pirates.

It would be desirable to improve at least one aspect of the known electronic systems.

SUMMARY

One embodiment addresses all or some of the drawbacks of known electronic systems.

One embodiment provides a method for authenticating instructions and operands in an electronic system comprising a controller, the method comprising:
  extracting instructions and operands via a first circuit of the controller from at least a first memory internal to the controller by means of a matrix bus of the controller;
  collecting, on the matrix bus, via a second circuit internal to the controller, instructions and operands during their transmission to the first circuit; and
  generating a word representative of the instructions.

Another embodiment provides an electronic system comprising a controller, the controller comprising a first circuit configured to extract instructions and operands from at least a first memory internal to the controller by means of a matrix bus of the controller, and a second circuit configured to collect, on the matrix bus, the instructions and the operands when they are sent to the first circuit and to generate a word representative of the instructions and operands.

According to one embodiment, the first circuit is configured to execute the instructions, the instructions being the startup instructions of the system.

According to one embodiment, the second circuit is configured to compare the word representative of the instructions to a reference word.

According to one embodiment, the second circuit is configured to determine that the instructions are authentic when the word representative of the instructions is identical to the reference word and that the instructions are not authentic when the word representative of the instructions is not identical to the reference word.

According to one embodiment, the system is configured to be restarted or turned off if the second circuit determines that the instructions are not authentic.

According to one embodiment, the second circuit comprises a second memory in which the reference word is stored from an initial programming of the system.

According to one embodiment, the second circuit determines the beginning of the instructions by comparing the addresses to a start address of the instructions stored in the second memory.

According to one embodiment, the end of the data is determined by a predetermined duration after the beginning of the instructions or by comparing the addresses to an end address of the instructions stored in the second memory.

According to one embodiment, the first memory is a non-volatile memory internal to the controller, the controller comprising a third memory, the first memory comprising the instructions and the third memory comprising the operands.

According to an embodiment, the matrix bus comprises buses forming lines and columns, each intersection between a line and a column being configured to allow or not the information transfer between the line and the column.

According to an embodiment, the first circuit is coupled to the matrix by a first input/output on which are transmitted the instructions, and at least a second input/output on which are transmitter the operands.

According to an embodiment, the first memory is coupled to first and second inputs/outputs of the first circuit by the matrix bus and the third memory is coupled to the third input/output of the first circuit by the matrix bus.

According to one embodiment, the operands include parameters for initialization of at least one element among: a protection unit of the memory, a circuit of the "watchdog" type, or circuits for protecting non-volatile memories.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the different applications of the embodiments of electronic systems will not be described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
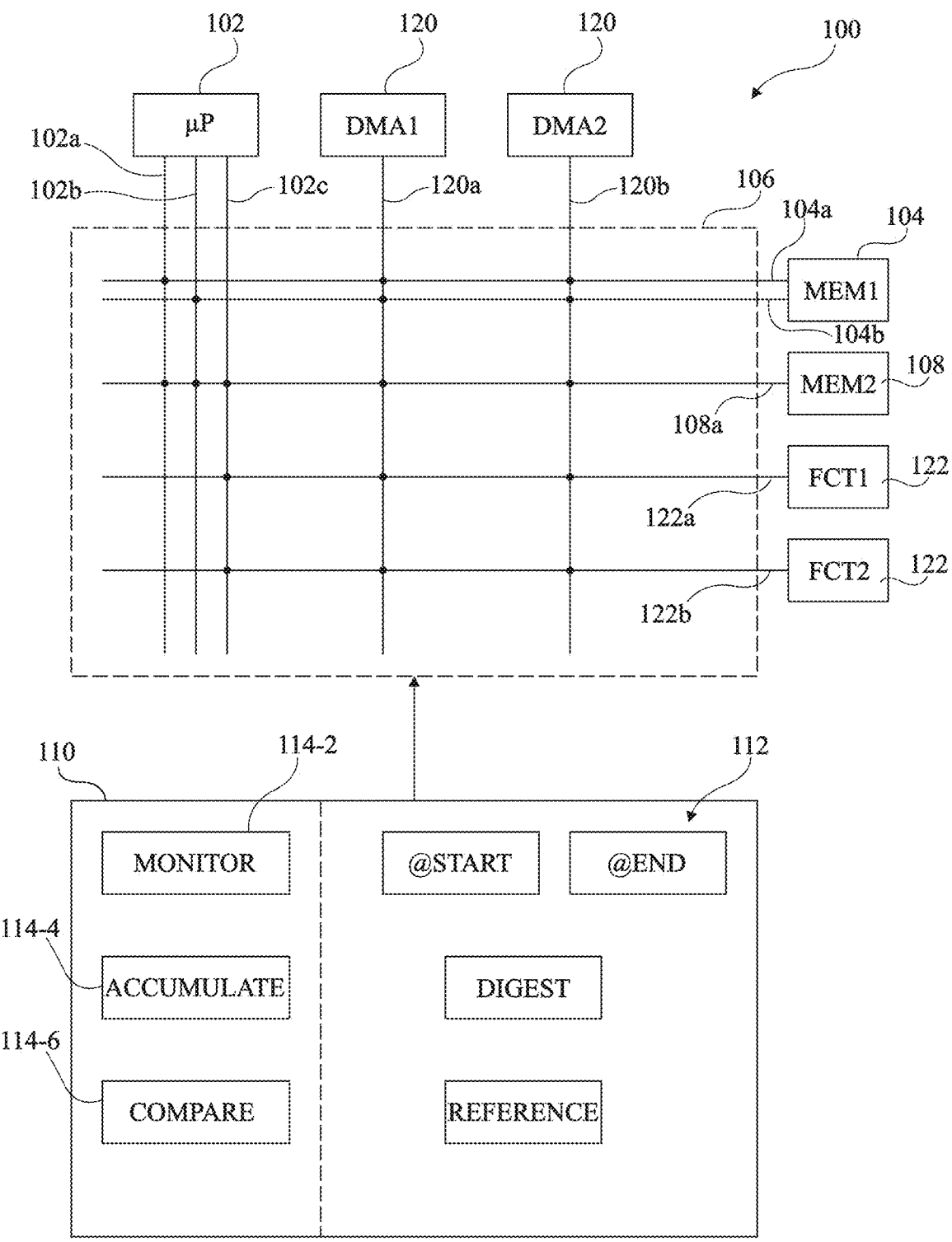
FIG. 1 shows an embodiment of an electronic system.

FIG. 1 shows an embodiment of an electronic system 100. The system 100 is a system for which one seeks to protect instructions, for example the startup instructions, for example against modifications. The system 100 for example corresponds to a connected object, for example in the field of home automation. The embodiments described here are particularly applicable to types of systems that were not ordinarily connected to a network. More precisely, FIG. 1 represents a controller of the system 100.

The system 100, and more precisely the controller of the system, comprises a circuit 102, preferably a processor (μP). The system comprises at least one memory 104 (MEM1). The memory 104 is an internal memory of the controller. The memory 104 is a rewritable non-volatile memory, for example a flash memory. The system also comprises at least one memory 108 (MEM2), for example volatile, for example a RAM memory. The memory 108 is also an internal memory of the controller. Preferably, the memories 104 and 108 are distinct memories.

The different elements of the system, in particular the memories 104 and 108 and the processor 102, are connected to one another by an array of buses 106, or matrix bus of interconnection, for example an advanced high-performance bus (AHB). The matrix bus 106 is internal to the controller. The matrix bus allows the coupling of "master"-type circuits to "slave"-type circuits. Each element of the device is coupled to at least one line or to at least one column of the matrix. Preferably, the "master"-type elements are coupled, preferably connected, to columns and the "slave"-type elements are coupled, preferably connected, to lines. The lines and columns of the matrix bus are element for information transmission, for example buses.

Processor 102 is coupled, preferably connected, to three columns of the matrix 106: a column on which instructions are transmitted, and at least one column on which the operands are transmitted. In the example of FIG. 1, the processor is coupled, preferably connected, to two columns on which the operands are transmitted.

The memory 104 is form example coupled, preferably connected, to two lines, for example a line on which instructions are transmitted and a line on which the operands are transmitted. Memory 108 is for example coupled, preferably connected, to a line of the matrix 106.

System 100 can further comprise other circuits connected to the matrix 106, for example one or several direct memory access circuits 120 (DMA1, DMA2) and circuits running other functions, represented in FIG. 1 by the blocs 122 (FCT2, FCT2). Each DMA is for example coupled, preferably connected, to a column of the matrix 106. Each circuit 122 is for example coupled, preferably connected, to a line of the matrix 106.

Each line crosses all the columns and, inversely, each column crosses all the lines. Every crossing does not however correspond to an electrical connection. Each crossing corresponds to a possible electrical connection. It is possible to choose which line is electrically connected to which column. Preferably, this is determined during the manufacturing of the device. The liaisons are therefore fixed and unchanging during the working f the device.

Therefore, in the device 100, a column 102a, coupled, preferably connected, to an input/output of the processor 102, is connected to a line 104a coupled, preferably connected, to an input/output of the memory 104 and to a line 108a coupled, preferably connected, to an input/output of the memory 108. These liaisons are represented, in FIG. 1, by points at the interconnections of lines and columns. Therefore, processor 102 is coupled, preferably connected, to the memory 104 by column 102a and the line 104a and is coupled, preferably connected, to the memory 108 by column 102a and line 108a.

In the embodiment of FIG. 1, the crossing:

between the column 102a and a line 104b coupled, preferably connected, to another input/output of the memory 104;

between the column 102a and a line 122a coupled, preferably connected to an input/output of the block FCT1; and between the column 102a and a line 122b coupled, preferably connected, to an input/output of the block FCT2, are not configured to allow an electrical connection. Thus, it is not possible for the processor 102 to exchange information with the blocks FCT1 and FCT2 by the lines 102a.

Similarly, in the embodiment of FIG. 1, a column 102b, coupled, preferably connected, to an input/output of processor 102, is coupled, preferably connected, to the line 104b and to the line 108a, but is not coupled to lines 104a, 122a, 122b.

Preferably, processor 102 is coupled, preferably connected, to the memory 104 by the column 102a and the line 104a, on which the instructions are transmitted and by the column 102b and the line 104b, on which the operands are transmitted.

Column 102c, coupled to an input/output of processor 102, is, in the example of FIG. 1, coupled, preferably connected, to the line 108a, 122a and 122b. The column 102c is a column on which the operands are transmitted. Column 102c is not, in the example of FIG. 1, coupled to lines 104a and 104b. Thus, processor 102 is not, preferably, coupled to memory 104 by column 102c on which the operands are transmitted. Processor 102 is however coupled to memory 108 by the column 102c and the line 108a, in order to be able to transmit the operands.

Processor 102 can thus receive instructions or operands located in the memory 104 and receive operands located in the memory 108.

The DMA 120 are for example coupled, preferably connected, to lines 104a, 104b, 108a, 122a and 122b respectively by the columns 120a and 120b.

Memories 104 and 108 store boot data, meaning boot, or initialization, instructions of the system, stored preferably in the memory 104 and operands used during the boot, stored preferably in memory 108.

Boot instructions refer to the instructions themselves. The boot instructions are executed by the circuit 102, and are transmitted by the line 104a of the matrix 106. The boot instructions are preferably among the first instructions executed during the startup of the system. The boot instructions for example comprise the operands of at least one element among: a protection unit of the memory, which may or may not authorize access by different parts of the memories to the different peripherals and the different programs, a circuit of the "watchdog" type, and protection circuits for non-volatile memories.

By circuit of the "watchdog" type, it is meant a circuit comprising a timer, the timer being restarted regularly before reaching its final value in a normal situation. If the device faces an attack stopping the timer to be restarted, it reaches its final value and an error is detected.

The boot date, meaning the boot instructions and operands, are written in the memories during the initial programming of the system. The boot data are not meant to be modified outside of total reprogramming of the system, which would involve total erasure of the memories 104 and 108. This reprogramming would then be considered the new initial programming of the system. Thus, modifications of the boot instructions involve a pirating attempt, for example seeking to bypass the security measures of the system 100.

The system 100 comprises a circuit 110 for authentication of the instructions, preferably comprising an internal memory 112 and various logic circuits 114. Preferably, circuit 110, processor 102, matrix bus 106 and memories 104 and 108 are part of a same microcontroller.

The various logic circuits 114 comprise a circuit 114-2 (MONITOR) configured to monitor the matrix bus 106. More precisely, the circuit 114-2 is configured to monitor all the liaisons of the matrix bus. In particular, the logic circuit 114-2 monitors the passage of the addresses of the instructions sent by the memory 104 on the column 102*b* and the line 104*b*. The logic circuits 114 comprises a circuit 114-4 (ACCUMULATE) configured to collect the data on the liaisons of the matrix bus and to obtain a word (DIGEST) representative of the boot data, and a circuit (114-6 (COMPARE) configured to compare the representative word to a reference word (REFERENCE).

The internal memory 112, corresponding preferably to the registers, comprises data relative to the authentication of the boot instructions. In particular, the registers of memory 112 comprise the reference word REFERENCE and the representative word DIGEST. Additionally, the registers of memory 112 can comprise elements characterizing the boot instructions, for example the address of the first instruction (@START) and the address of the last instruction (@END).

All boot data transmitted, by the matrix bus, between the transmission of a first data, preferably a first instruction, for example identified by its address @START and the last data, preferably a last instruction to authenticate, identified by its address @END. Preferably, only data stored by the memories 104 and 106 are provided between the first and the last data. However, information, for example data, transmitted on other lines or columns can be transmitted between the first and last data and are also used for the generation of the representative word.

Alternatively, several data sequences can be used to form the representative word, these sequences being potentially separated by data sequences not being used in the formation of the representative word. The internal memory stores preferably the addresses of start and end of each of the sequences used to generate the representative word.

The data used to generate the representative word are so that, between the first and last data, the instructions and the operands transmitted to the processor 102 are always exactly the same, preferably in the same order. Preferably, the generation of the representative word is always done with instructions and at least one operand.

Preferably, the circuit 110 comprises:

wiring (114-2) allowing the monitoring of data transmitted on all lines and columns of the matrix bus;

logic elements (114-2) allowing the determination of the beginning and end of data to authenticate, for example logic elements allowing the comparison of the addresses transmitted on the line and column 104*a* and 102*a*;

logic elements (114-4) allowing the generation of the representative word;

logic elements (114-6) allowing the comparison of binary words, and allowing thus the comparison of the representative word DIGEST with the reference word REFERENCE;

a clock allowing the synchronization of elements of the circuit 110; and registers 112 in which the reference word and the addresses of the beginning and the end of the data sequences to authenticate are stored.

Figure 2:
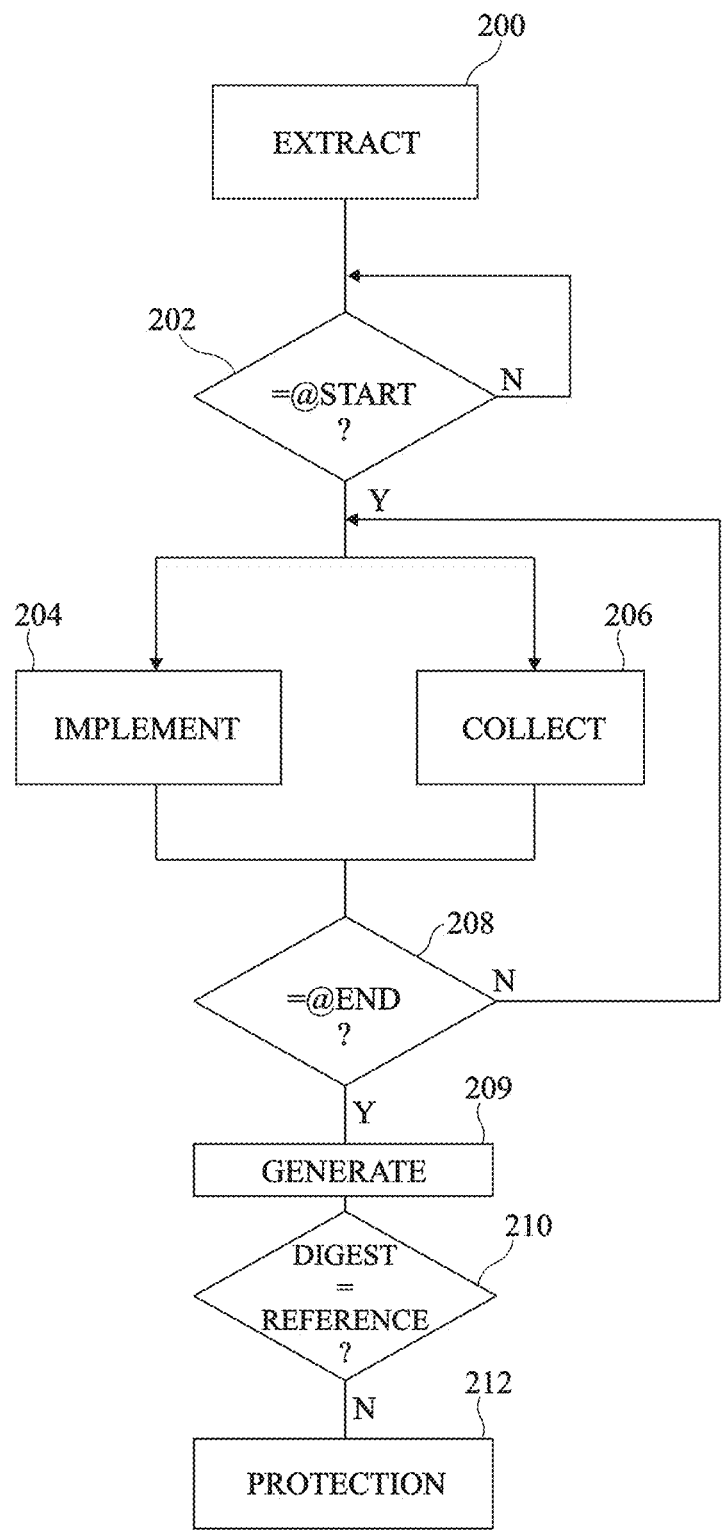
FIG. 2 shows an embodiment of a method for authenticating instructions and data.

FIG. 2 shows an embodiment of a method for authenticating instructions, for example done by the system 100 of FIG. 1.

The method comprises a first step 200 during which the processor 102 sends a request to the memory 104 to extract (EXTRACT) the boot instructions. This step is done during the startup of the system 100.

The boot instructions are next sent to the circuit 102 by means of the matrix bus 106, with the aim of being executed by the processor 102.

The circuit 110 can be configured to determine the beginning of the boot instructions by monitoring the data bus and identifying the first instruction itself.

Alternatively, the circuit 110 monitors the bus 106 and is configured to identify the first boot instruction sent by the memory 104. To that end, the addresses of the instructions passing over the address bus are for example compared (step 202, "=@START?") to the address @START of the first boot instruction.

Alternatively, the circuit 110 can be configured to determine the beginning of the boot instructions without comparing the addresses of the instructions sent to a preprogrammed address. For example, the circuit 110 can consider that the first instruction sent by the memory 104 is the first boot instruction.

The circuit 110 can be configured to monitor, during a preprogrammed duration, the bus 106 so as to identify the first boot instruction. If the first boot instruction has not been identified during this duration, the circuit 110 determines that there is a problem in the boot instructions and that the security of the system may be compromised.

According to an embodiment, circuit 110 can be configured to monitor, during a preprogrammed duration, the bus 106 in order to spot the last boot instruction of the sequence to be authenticated. If the last boot instruction has not been spotted during this duration, circuit 110 determine that there is a problem at the level of the boot instructions and that the safety of the system may be compromised.

When the first boot instruction is identified (branch Y of step 202), each data passing through the matrix bus is, on the one hand, collected by the circuit 102 in order to be implemented (step 204, "IMPLEMENT"), and, on the other hand, collected by the circuit 110 (step 206, "COLLECT"). Thus, the circuit 110 monitors the matrix bus 106 and directly reads the instructions and their addresses therein, for example on the columns 102*a* and 102*b*, as well as the operands, for example on the column 102*c*. Steps 204 and 206 are carried out in parallel and the data are therefore processed in parallel by the circuits 102 and 110.

The circuit 110 next determines (step 208) whether the sent instruction is the last instruction. For example, the address, on the address bus, of the sent instruction is compared to the address @END of the last boot instruction. If the address of the sent instruction is different from the address @END (branch N of step 208), one returns to steps 204 and 206 to send the following data. If the address of the sent instruction is equal to the address @END (branch Y in step 208), the sending of the boot data is considered to be completed and one goes to the following step.

The end of the instructions, in other words the end of the sequence of boot data to be authenticated, can alternatively be determined by a duration t1 corresponding to the time taken by the set of boot data to be sent to the circuit 102. The end of the boot data corresponds to the time t+t1, where t is the start time of the boot data (for example the time of step 202). The duration t1 is for example stored in the internal memory 112.

In step 209 (GENERATE) following step 208 (branch Y), the boot data collected by the circuit 110 on the matrix bus are used to generate the representative word (DIGEST). According to one example, the data collected on the matrix bus are all stored in an internal memory 112 and the representative word is generated a single time from all of the stored instructions. According to another example, the circuit 110 can update the representative word each time a data is collected by the circuit 110 in step 206.

After the end of sending of the data and after generating the definitive representative word DIGEST, that is to say, after step 209, the representative word is compared to the reference word (REFERENCE), stored in the memory 112.

Each time the system is initialized, the reading sequence of the boot instructions is identical. The same boot instructions and the same operands are extracted by the circuit 102 in the same order on the matrix bus. The representative word is therefore the same upon each initialization in the absence of modification.

Thus, if the representative word is different from the reference word (branch N of step 210), this means that the instructions having been implemented and/or the operands provided do not correspond to the provided and authentic instructions and that the security of the system may be compromised. Protective measures can then be taken (step 212), for example restarting the system, or turning off the system.

In the case where the reference word and the representative word are the same, this means that the implemented instructions are the authentic instructions and that the operands are authentic. The starting of the system 100 can therefore continue.

Preferably, the circuit 110 is turned off after the authentication of the boot data. The circuit 110 would then only be turned on again after the following startup of the system, for example by receiving a reboot signal.

The addresses @START and @END, the duration t1 and the reference word REFERENCE have for example been written in the memory 112 during the initial programming of the system. The addresses @START and @END, the duration t1 and the reference word REFERENCE are for example determined once, for example by simulation on an emulator, and are next written in the memories 104 by a plurality of similar systems.

Alternatively, the initial programming of each system can comprise a step during which these values are determined for the considered system.

Different functions can be used to generate the representative word DIGEST from data. For example, a hash function can be used. Likewise, any function able to generate a signature from data can be used.

The size of the boot instructions is preferably less than 5 kilobytes, for example between about 2 and about 3 kilobytes.

The size of the representative word is for example less than or equal to 32 kilobytes. The size of the representative word is preferably independent of the sizes of words stored in the memories.

The start @START and end @END addresses of the boot instructions can for example form a range of addresses of the memory 104 in which all of the boot instructions are present. Thus, if an instruction having an address outside this range is sent over the bus between the beginning and the end of the instructions, the circuit 110 can detect a problem and for example stop the booting of the system 100. For example, a pirate attack may consist of causing the circuit 110 to seek to extract the boot instructions from a memory other than the memory 104, for example the memory 108. The sent instructions are then outside the authorized range and the attack can therefore be identified. To that end, the circuit 114-2 monitors the addresses of the sent data until the end of the boot instructions.

As a variant, the boot instructions can comprise data, or can use data, located outside the range formed by the start (@START) and end (@END) addresses of instructions. For example, part of the boot instructions can be located in any one of the other memories, for example located in the memory 108. The internal memory can comprise several addresses determining several address ranges, optionally in several memories, in which authentic boot data are comprised. These data are collected by the circuit 110, for example by means of a data bus 106, and are also used to generate a representative word DIGEST. These data should for example be the same each time the system is started up, like the boot instructions located in the memory 104.

Another solution would be to verify the instructions stored in the memory before sending boot instructions, so as to ensure that the stored instructions indeed correspond to the authentic instructions. However, a pirate could, without modifying the instructions stored in memory, cause the sent instructions not to be the provided instructions, which would not be detected. One advantage of the embodiments described here is that they make it possible to identify modifications appearing during the transmission of the instructions.

An advantage of the described embodiments is that the elements are internal elements of a controller. In particular, the memories are internal memories of the controller. The liaison between the circuits 102 and 110 and the memories are therefore more secure.

Another advantage is that the authentication of the code is done by the same controller that implements the instructions. It is therefore not necessary for the system to have a second controller. Furthermore, circuit 110 does not comprise a processor, the comparisons and computations being made by logic circuits. The circuit 110 thus has a structure simple to implement.

Various embodiments and variants have been described. Those skilled in the art will understand that certain features of these embodiments can be combined and other variants will readily occur to those skilled in the art. In particular, the embodiments described here can be applied to sets of instructions other than the boot instructions. These sets of instructions are identical sets of instructions upon each execution.

Finally, the practical implementation of the embodiments and variants described herein is within the capabilities of those skilled in the art based on the functional description provided hereinabove.

The invention claimed is:

1. A method for authenticating instructions and operands in an electronic system comprising a controller, the method comprising:
   extracting the instructions and the operands via a first circuit of the controller from at least a first memory internal to the controller using a matrix bus of the controller;
   determining, by a second circuit internal to the controller, a beginning of the instructions by comparing an address of each instruction on the matrix bus with a start address stored in a second memory internal to the controller;
   determining, by the second circuit internal to the controller, an ending of the instructions by comparing the address of each instruction on the matrix bus with an end address stored in the second memory;
   collecting, on the matrix bus, via the second circuit, the instructions and the operands during their transmission to the first circuit based on the determining of the beginning and the ending of the instructions, wherein the collecting of the instructions and the operands begins in response to the determining the beginning of the instructions, and wherein the collecting of the instructions and the operands ends in response to the determining the ending of the instructions; and
   generating a word representative of the instructions collected.

2. The method according to claim 1, further comprising executing, by the first circuit, the instructions, the instructions being startup instructions of the electronic system.

3. The method according to claim 1, further comprising comparing, by the second circuit, the word representative of the instructions to a reference word.

4. The method according to claim 3, further comprising determining, by the second circuit, that the instructions are authentic in response to the word representative of the instructions being identical to the reference word.

5. The method according to claim 3, further comprising determining, by the second circuit, that the instructions are not authentic in response to the word representative of the instructions not being identical to the reference word.

6. The method according to claim 5, further comprising restarting or turning off the electronic system in response to the instructions not being authentic.

7. The method according to claim 3, further comprising storing the reference word in the second memory, from an initial programming of the electronic system.

8. The method according to claim 1, wherein the operands include parameters for initialization of at least one element selected from the group consisting of: a memory protection unit, a watchdog-type circuit, non-volatile memory protection circuit, and combinations thereof.

9. An electronic system comprising:
   a controller, the controller comprising:
      a first memory;
      a second memory;
      a matrix bus;
      a first circuit configured to extract instructions and operands from at least the first memory using the matrix bus; and
      a second circuit configured to:
         determine a beginning of the instructions by comparing an address of each instruction on the matrix bus with a start address stored in the second memory;
         determine an ending of the instructions by comparing the address of each instruction on the matrix bus with an end address stored in the second memory;
         collect, on the matrix bus, the instructions and the operands sent to the first circuit based on the determining the beginning and the ending of the instructions, wherein the collecting of the instructions and the operands begins in response to the determining the beginning of the instructions, and wherein the collecting of the instructions and the operands ends in response to the determining the ending of the instructions; and
         generate a word representative of the instructions.

10. The electronic system according to claim 9, wherein the instructions are startup instructions of the electronic system, and the first circuit is configured to execute the instructions.

11. The electronic system according to claim 9, wherein the second circuit is configured to compare the word representative of the instructions to a reference word.

12. The electronic system according to claim 11, wherein the second circuit is configured to determine that:
   the instructions are authentic when the word representative of the instructions is identical to the reference word; and
   the instructions are not authentic when the word representative of the instructions is not identical to the reference word.

13. The electronic system according to claim 12, wherein the electronic system is configured to be restarted or turned off in response to the second circuit determining that the instructions are not authentic.

14. The electronic system according to claim 11, wherein the reference word is stored from an initial programming of the electronic system.

15. The electronic system according to claim 9, wherein the first memory is a non-volatile memory internal to the controller, the controller comprises a third memory, the first memory comprises the instructions, and the third memory comprises the operands.

16. The electronic system according to claim 9, wherein the matrix bus comprises buses forming lines and columns, and wherein each intersection between a line and a column is configured to allow or not information transfer between the line and the column.

17. The electronic system according to claim 9, wherein the first circuit is coupled to the matrix bus by a first input/output on which are transmitted the instructions, and at least a second input/output on which are transmitter the operands.

18. The electronic system according to claim 17, wherein:
   the first memory is a non-volatile memory internal to the controller, the controller comprises a third memory, the first memory comprises the instructions, and the third memory comprises the operands; and
   the first memory is coupled to the first and second inputs/outputs of the first circuit by the matrix bus, and the third memory is coupled to a third input/output of the first circuit by the matrix bus.

19. The electronic system according to claim 9, wherein the operands include parameters for initialization of at least one element selected from the group consisting of: a memory protection unit, a watchdog-type circuit, non-volatile memory protection circuit, and combinations thereof.

20. A controller, comprising:
a first memory;
a second memory;
a matrix bus;
a first circuit configured to extract instructions and operands from at least the first memory using the matrix bus; and
a second circuit configured to:
  determine a beginning of the instructions by comparing an address of each instruction on the matrix bus with a start address stored in the second memory,
  determine an ending of the instructions by comparing the address of each instruction on the matrix bus with an end address stored in the second memory,
  collect, on the matrix bus, the instructions and the operands sent to the first circuit based on the determining the beginning and the ending of the instructions, wherein the collecting of the instructions and the operands begins in response to the determining the beginning of the instructions, and wherein the collecting of the instructions and the operands ends in response to the determining the ending of the instructions, and
  generate a word representative of the instructions.

21. The controller of claim 20, wherein the instructions are startup instructions of an electronic system hosting the controller, and the first circuit is configured to execute the instructions.

22. The controller of claim 20, wherein the second circuit is configured to compare the word representative of the instructions to a reference word.

23. The controller of claim 22, wherein the second circuit is configured to:
  determine that the instructions are authentic in response to the word representative of the instructions being identical to the reference word; and
  determine that the instructions are not authentic in response to the word representative of the instructions not being identical to the reference word.

* * * * *